(No Model.)
W. H. PAIGE.
CAR WHEEL.
No. 274,218. Patented Mar. 20, 1883.
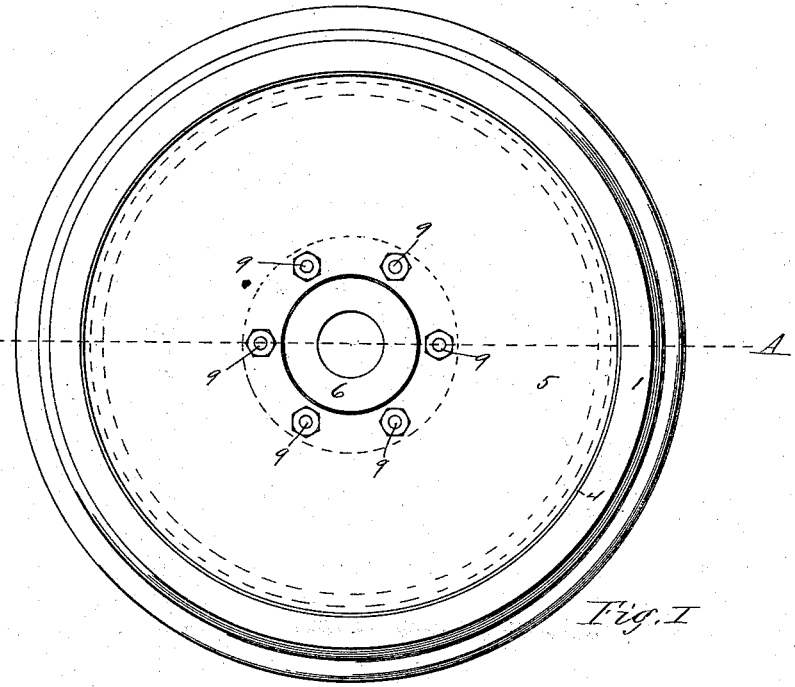
Fig. I
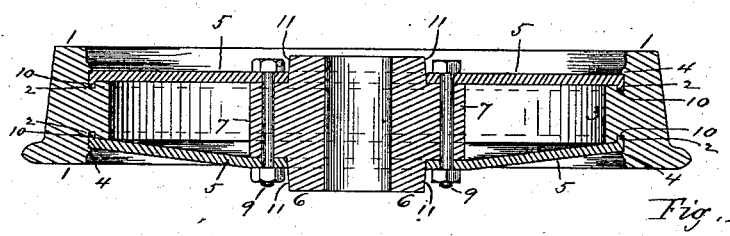
Fig. III
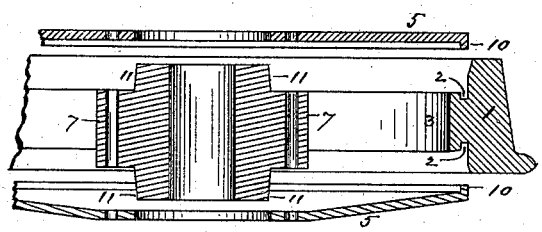
Fig. II
Witnesses.
Chas. H. Wood.
E. E. Heaton.
Inventor.
William H. Paige
By T. A. Curtis
his atty.

UNITED STATES PATENT OFFICE.

WILLIAM H. PAIGE, OF SPRINGFIELD, MASSACHUSETTS.

CAR-WHEEL.

SPECIFICATION forming part of Letters Patent No. 274,218, dated March 20, 1883.

Application filed December 30, 1882. (No model.)

*To all whom it may concern:*

Be it known that I, WILLIAM H. PAIGE, of Springfield, in the county of Hampden and State of Massachusetts, have invented a new and useful Improvement in Railway-Car Wheels, of which the following is a specification and description.

The object of my invention is to provide a railway-car wheel whose side plates, made of wrought metal, are provided with retaining-flanges, which are inserted each into an annular cavity made in the tire and there secured by upsetting the metal of the tire against the outside of the plate, around its outer edge, by which construction the tire will be retained in place without the use of bolts inserted through the tire, and this I accomplish by the construction substantially as hereinafter described, and illustrated in the accompanying drawings, in which—

Figure 1 is a side view of a car-wheel made according to my invention. Fig. II is a transverse section through the tire and through a portion of the plates, showing the retaining-flanges and the grooves in the tire to receive them before the flanges are secured therein; and Fig. III is a transverse section of the wheel at line A of Fig. I, showing the flanges of the side plates as secured in the annular grooves of the tire.

In the drawings, 1 represents the tire of a car-wheel, in each side of which I form an annular groove, 2. The side plates, 5, I form from wrought metal, both of the same or similar form, being circular, with an annular flange, 10, turned inward toward the tire at the outer edge or rim, and this flange is approximately fitted into its annular groove 2 in the tire.

The hub 6 may be made from either cast or wrought metal, and is provided with an annular projection, 7, with a shoulder, 11, on each side thereof. The plates 5 are each bored or have a central hole, 12, to receive the end of the hub, which is suitably fitted therein, so that each plate 5, when in place, has a firm bearing laterally against the side of the annular projection 7 and in the direction of the plane of the plate against the shoulder 11, and the plates are secured to the hub by bolts 9, each inserted through holes made in the plates and in the hub therefor. When the plates 5 are fitted to the hub their flanges 10 are also inserted into the grooves 2, and are there secured by upsetting the metal of the tire around each groove, as at 4, driving the metal inward toward the hub and against the outside of each plate at its rim, as shown at 4 in Fig. III. That part 3 of the tire which projects inward toward the hub forms an annular double flange, which supports the outer portion of both plates, around their rim, so that said plates have a firm bearing in the tire, and the hub, (which is bored to receive the axle,) the plates 5, and the tire 1 are all firmly secured together.

If desired, the plates 5 may be further braced by bolts inserted through them just inside the annular projection 3 of the tire, as shown in dotted lines in Fig. II; but I do not deem it essential, inasmuch as the plates secured in the tire by inserting their flanges in the grooves 2, as above described, with the metal of the tire upset against the outside of each plate, form a very strong connection for securing the tire to the plates, and render the use of retaining rings or bolts inserted through the plates and through the tire entirely unnecessary for securing the tire to the plates. When secured in this manner, should the tire become cracked or a section thereof entirely broken out, even when in use, it will be impossible for such broken part to become detached from the plates, as the flanges will retain it in its position until such time as it could be repaired or a new wheel substituted.

The metal of the tire at 4 may be upset or turned against the plate by a hand-tool or by spinning it in by a rotary tool while the wheel is being revolved, or by any other convenient means.

Having thus described my invention, what I claim as new is—

The combination of the hub 6, provided with the annular flange 7, the tire 1, having the annular projection 3, and provided on each side with an annular groove, 2, and the side plates, 5, centrally bored to receive the ends of the said hub, and provided with annular retaining-flanges 10, inserted into said annular grooves in the tire, and there secured by upsetting the metal of the tire against the outside of said plates at their outer edges, substantially as described.

WILLIAM H. PAIGE.

Witnesses:
T. A. CURTIS,
CHAS. H. WOOD.